United States Patent [19]

Bullard

[11] Patent Number: 4,881,701

[45] Date of Patent: Nov. 21, 1989

[54] COMBINATION AUTOMOBILE AND AIRPLANE

[76] Inventor: Gary M. Bullard, Rte. #1, Box 177, Accomac, Va. 23301

[21] Appl. No.: 168,015

[22] Filed: Mar. 14, 1988

[51] Int. Cl.⁴ .............................................. B64C 3/56
[52] U.S. Cl. .................................. 244/49; 244/45 R; 244/45 A; 244/2
[58] Field of Search ................. 244/2, 49, 45 A, 45 R

[56] References Cited

U.S. PATENT DOCUMENTS 1,393,820 10/1921 Osborne ................................ 244/49
1,731,757 10/1929 Tubbe .................................... 244/49
3,012,737 12/1961 Dodd ...................................... 244/2
3,371,886 3/1968 Schertz .................................. 244/2
4,627,585 12/1986 Einstein ................................. 244/2

Primary Examiner—Joseph F. Peters, Jr.
Assistant Examiner—Rodney Corl
Attorney, Agent, or Firm—John B. Dickman, III

[57] ABSTRACT

A convertible airplane to automobile and visa versa, having a fuselage and three wings, including a forward canard wing, a foldable main wing and a secondary lift wing. The foldable wing is capable of folding to a size for safely driving the automobile on a roadway. All wings are used as ground effect airfoils for roadway use.

7 Claims, 4 Drawing Sheets

COMBINATION AUTOMOBILE AND AIRPLANE

BACKGROUND OF THE INVENTION

The present invention relates to a vehicle for use as an airplane, and as an automobile, more particularly, an airplane with canard type wings and an engine for driving a propeller where the wings fold and the engine drives a transmission and drive shaft when the vehicle is converted to an automobile.

There have been several attempts to provide an aircraft which converts to an automobile. What is apparent about all of these vehicles is that the wings are either removed or folded in some fashion so that the converted automobile will conform to an eight foot road lane. Two main methods for folding the wings which are important upon considering the present invention are: those wings which fold against the sides of the fuselage, and those which pivot into or are stored under the airplane body. My invention has wings that are just re-adjusted to be used in both, flying and driving modes. In the first situation, the wings are pivoted from the horizontal plane to the vertical and pivoted vertically against the sides of the fuselage, either by pivoting forward or backward. In the second situation, the wings are pivoted about vertical planes to tuck the wings either into compartments in the fuselage or under it. There are several U.S. patents which show both methods for wing movements. A list of these and other U.S. patents known to the inventor can be found in the inventor's statement.

U.S. patents which are important to one or more features of the present invention include the following:
U.S. patent Re 25,368 RETHORST
U.S. patent 2,539,489 SMITH
U.S. patent 3,056,564 ZUCK
U.S. patent 3,065,927 MILLS The folding wings in Mills, U.S. Pat. No. 3,065,927, are similar to the wings of the present invention and yet there are differences. The Mills wings are hinged to fold flat on the top of the automobile. Each wing has two sections, one of which forms the wing tip and folds on the other section, and the other section is hinged to the vehicle body to fold into a recess in the roof. There are two differences between the Mills wings and the present invention; first, the Mills wings each have two sections, and the second, in the present invention, the wings fold one on the other. These also fold to uselessness, while mine are used for driving.

The Reissue patent to Rethorst, Re 25,368 and the patent to Zuck, 3,056,564, show convertible airplanes to automobiles with foldable wings and engines which drive both the propeller of the airplane and the rear wheels of the automobile. In Zuck, a single engine drives either the propeller or the wheels. Separate drive shafts operate the propeller and the wheels with engaging mechanisms to either operate one or the other drive shafts. The propeller is mounted at the rear of the airplane to push the airplane forward similar to the present invention. The wings in the Zuck patent pivot about a vertical plane to a position either under or over the fuselage.

The Rethorst patent, Re 25,368 shows a pair of engines for driving a pair of propellers and a single drive shaft for driving the rear wheels. The wings pivot horizontally into a compartment in the fuselage and the tail sections pivot onto the top of the fuselage, again into uselessness.

The pivotally wings of Smith, U.S. Pat. No. 2,539,489, pivot into a compartment in the fuselage, once again into uselessness. A pair of pins hold the wings in the flying position.

SUMMARY OF THE INVENTION

The convertible airplane-automobile of this invention is designed to have a canard configuration and a two passenger in-line seating narrow fuselage. The canard elevator wing has a low profile with cowled steerable wheels with means of suspension. A locking mechanism locks the elevator control surface in a down position, causing a ground effect suction to hold the vehicle down for ground use.

Mounted at the rear of the fuselage is a main wing, with a center fixed section on the top surface of the fuselage and a pair of foldable wing ends hinged to the center section. The wing ends fold on top of the center section and are wrapped in a cover when the vehicle is converted to an automobile. When used as an airplane the wing sections are locked in a flying position. There are ailerons and flaps for controlling flight.

A secondary lift wing is mounted under the main wing and under the fuselage. The secondary lift wing is about the same length as the center section of the main wing and houses the drive axle. Vertical stabilizers on the ends of the secondary lift wing are fixed to the center section of the main wing and houses rear wheels. The secondary wing has a two position control surface for lift during flight and for ground effect during road use.

There are rear drive wheels with means of suspension at either end of the secondary lift wing which are housed within the vertical stabilizers. The drive wheels, via their axles, are driven by the vertical drive shaft connected to an engine mounted in the rear of the vehicle. A transmission between the drive shafts and the engine provides the gears necessary for use as a ground vehicle.

The object is to provide an airplane with foldable, useable wings when used as an automobile.

Another object is to provide an airplane which converts to an automobile using the same engine to power both.

Yet another object is to provide an airplane with all wings folded aerodynamically for better ground control during use as an automobile.

A further object is to provide an airplane which converts to an automobile and has a fixed usable canard type wing.

Another object is to provide an airplane which converts to an automobile having a canard elevator wing, a foldable main wing and a secondary lift wing, all of which provides lift during flight and ground effect during road use.

These and other objects will become clearer from the description, claims and drawings.

DESCRIPTION OF THE INVENTION

Figure 1:
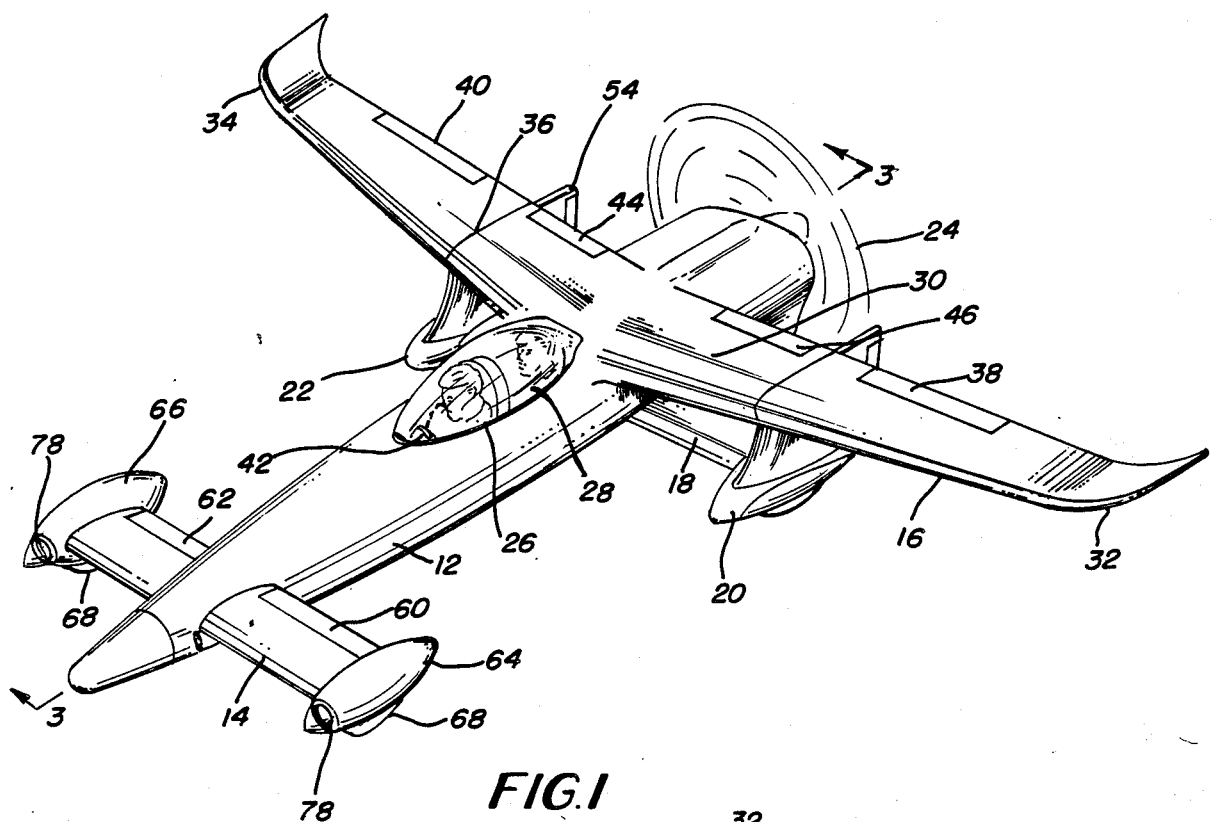
FIG. 1 is a perspective of an airplane which converts to an automobile according to the present invention.
Figure 2:
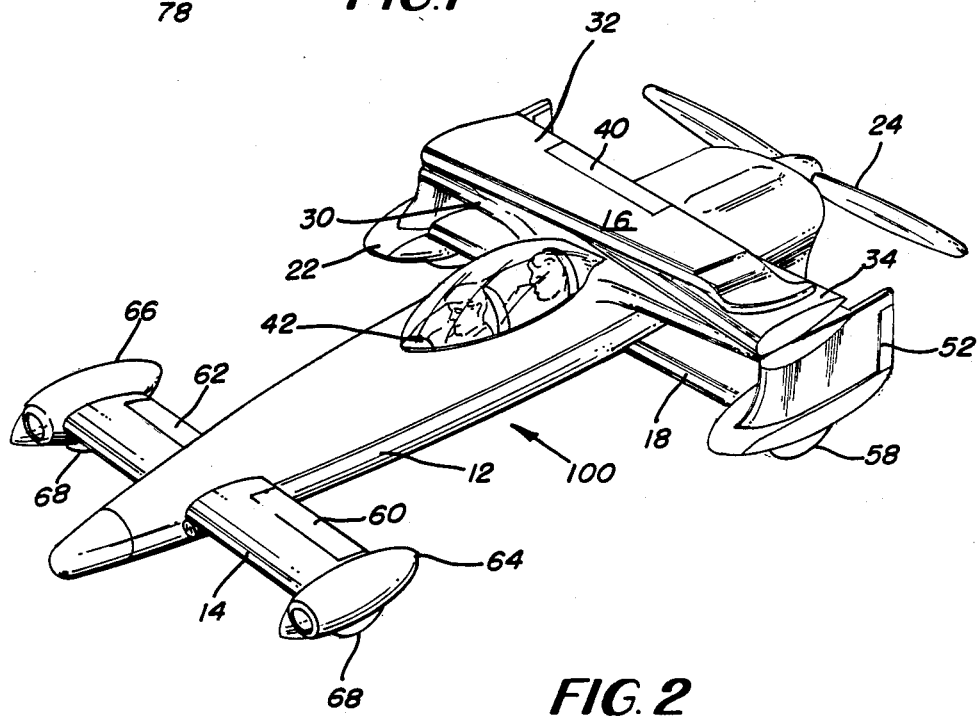
FIG. 2 is a perspective of an automobile which has been converted from an airplane according to the present invention.

With reference to the drawings, FIG. 1 shows a complete aircraft 10, and FIG. 2 shows the invention in its automobile form 100, whereby the main wings 16, are folded on the fuselage 12. A closer look at FIG.'s 1 and 2 show a fuselage 12 and three wings; a canard elevator wing 14, a main wing 16, and a secondary lift wing 18. The main wing 16 and the secondary lift wing 18 are connected by a pair of vertical stabilizers 20 and 22. A propeller 24 pushes the airplane 10, FIG. 1, but the propeller 24 does not rotate when the airplane is converted to an automobile 100, as in FIG. 2. In FIG. 1, the main wing 16 is shown in the airplane mode, whereas in FIG. 2 the main wing 16 is folded on the fuselage 12 in the automobile mode.

A closer look at the main wing 16 shows that there are sections, a center section 30 and two foldable wing sections 32 and 34. Each foldable wing section 32 and 34 is hinged to the center section 30 by top mounted hinge 36 in order to fold the wing sections onto the center section as in FIG.'s 2,4 and 5. The center section 30 is less than the legal width of a road lane, which is eight feet. When the wings are extended for flight, a mechanical lock holds the wings rigid.

There are ailerons 38 and 40 located on the foldable wing section 32 and 30 which operate by standard aircraft cables, not shown. These control cables are always intact and operational even in the folded position of FIG. 2. A steering yoke 42 controls the ailerons 38 and 40.

Figure 4:
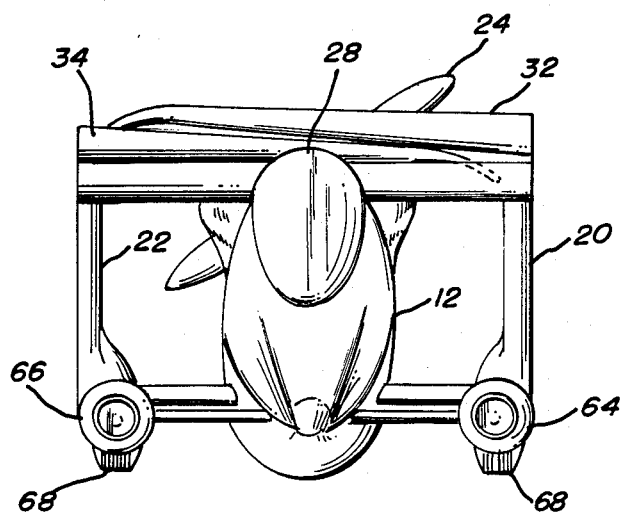
FIG. 4 is a front view of an airplane converted to an automobile according to the invention.

The center section 30 is fitted with flaps 44 and 46 which move up and down from the horizontal position. The down position produces the desired effect for landing purposes, while the horizontal position is for normal flight. The up position assists the shape of the folded wing sections 32 and 34, FIG. 2, 4, and 5, when covered to become a ground effect wing to hold the automobile 100 to the ground during a driving mode.

Figures 5, 6:
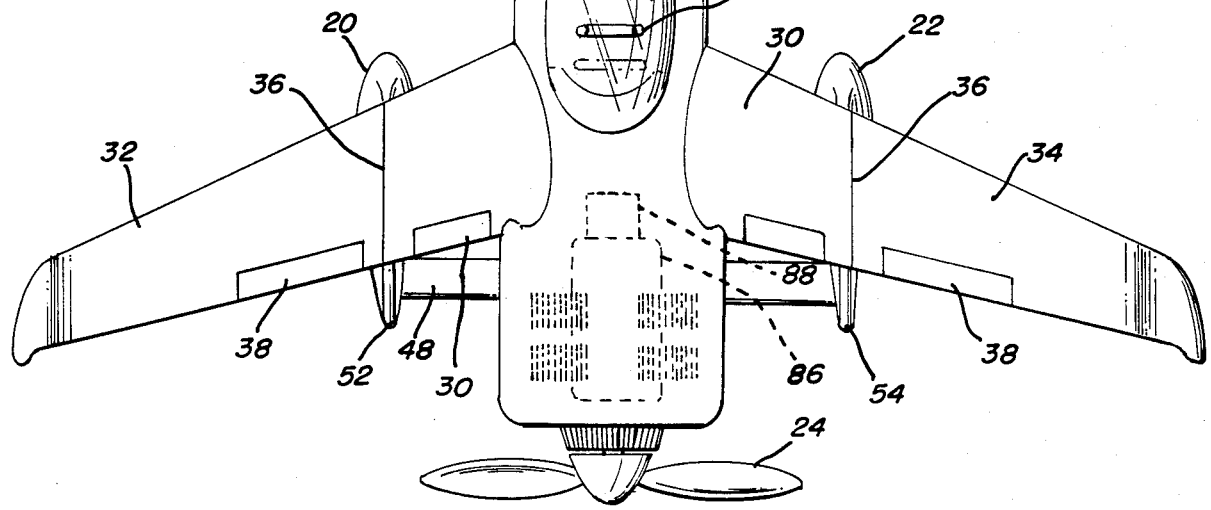
FIG. 5 is a rear view of an airplane converted to an automobile according to the invention.
FIG. 6 is a top plan view of an airplane which converts to an automobile according to the present invention.

Turning to the stationary secondary lift wing, 18, FIG. 6 shows the wing section with one single, long 2-position control surface 48, the in-line position being used for flight and the trailing-edge-up position used while driving, similar to the up position of elevator wing control surfaces 60.

To brace against stress of road bumps, etc., vertical stabilizers 20 and 22 connect the main wing 16, to the secondary lift wing 18. The vertical stabilizers 20 and 22 have rudders 52 and 54 (FIG. 8) to control turning the airplane. The rudders 52 and 54 are operated by cables connected to pedals in the cockpit 26. Housed in the vertical stabilizers are rear driven wheels 58.

FIG. 6 shows the canard wing 14 with elevator control surfaces 60 and 62. First, the elevator control surfaces 60 and 62 are activated by a push pull action on the steering yoke 42. Second, by locking the steering yolk 42 in the down or forward position, the elevators are locked in a "trailing edge up" position, thereby creating a ground effect wing to hold the front end of the automobile 100 to the ground while driving.

Figure 8:
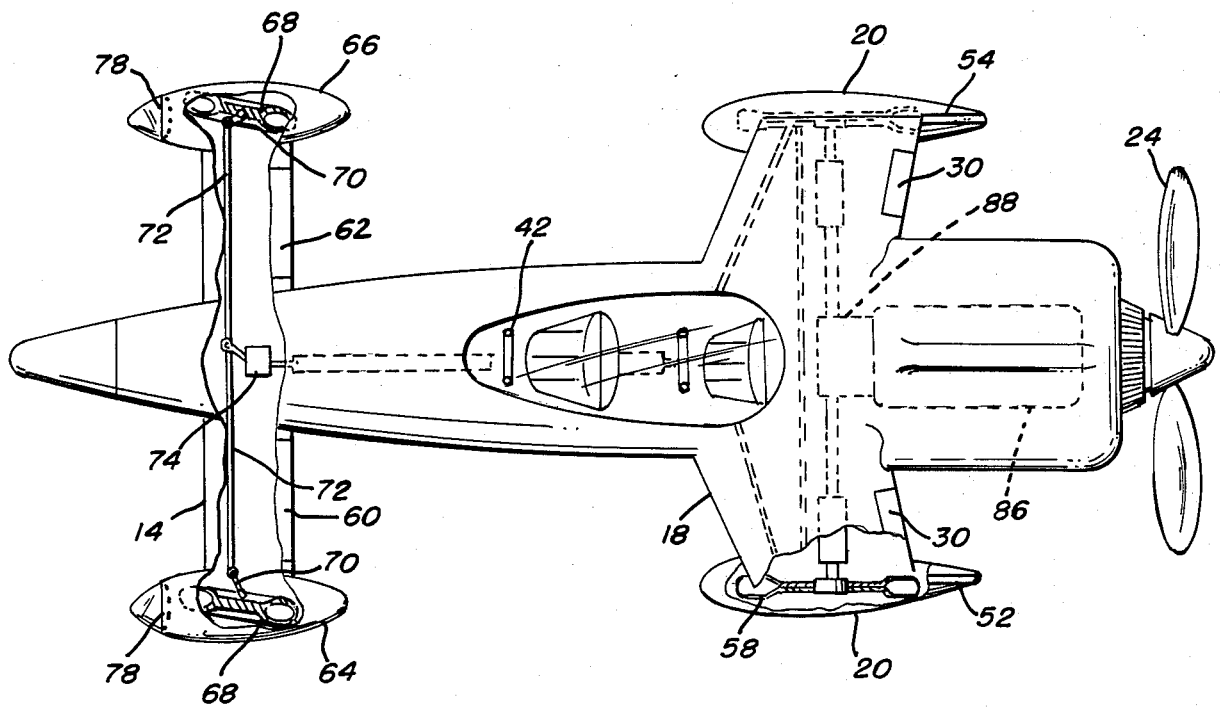
FIG. 8 is a top plan view with a sectional view taken along line 8—8.

At the end of the canard wing 14, are wheel pods 64 and 66 to streamline the steerable wheels 68. A complete steering mechanism is shown in FIG. 8 where the wheels 68 are connected by tie rod ends 70 and rod 72 to a steering box 74. Steering/aileron yolk 42 is connected to the steering box 74 to operate the wheels 68. The wheel pods or cowlings 64 and 66 have headlights 78. The wheels 68 are only exposed on the bottom and optional air-operated bottom covers to improve aerodynamics could be fitted within the pods 64 and 66. The moving parts in the canard wing 14 and wheel assembly remain operational and connected in both flight and ground travel modes.

The mid-body cockpit has seats for a pilot and a passenger, providing each with full control of the vehicle. Entrance to the cockpit 26 is provided by lifting the canopy 28. Located behind the passenger seat is a main baggage compartment 84 as shown in FIG. 3.

Figure 3:
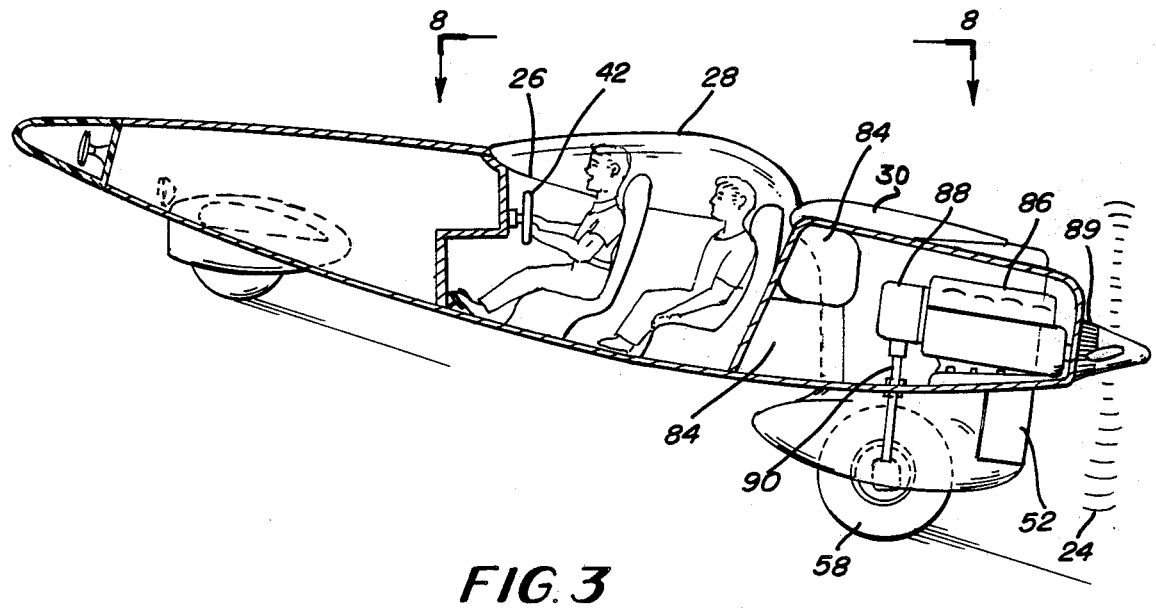
FIG. 3 is a cross section taken along the line 3—3 of FIG. 1.

A further look at FIG. 3 shows an engine 86 and a transmission 88 and propeller clutch 89. In the flight mode, the engine 86 is engaged to the clutch 89 of the propeller 24, in which case the transmission 88 is disengaged from the engine. However, in the automobile mode the reverse happens, the propeller clutch 89 is disengaged and the transmission is engaged. Drive output from the transmission 88 to the rear wheels 58 is accomplished by output shaft 90. The rear drive wheel 58 is connected by axle and gears to output shaft 90 to power the automobile 100. All four wheels have a means of shock absorbing suspension.

Figure 7:
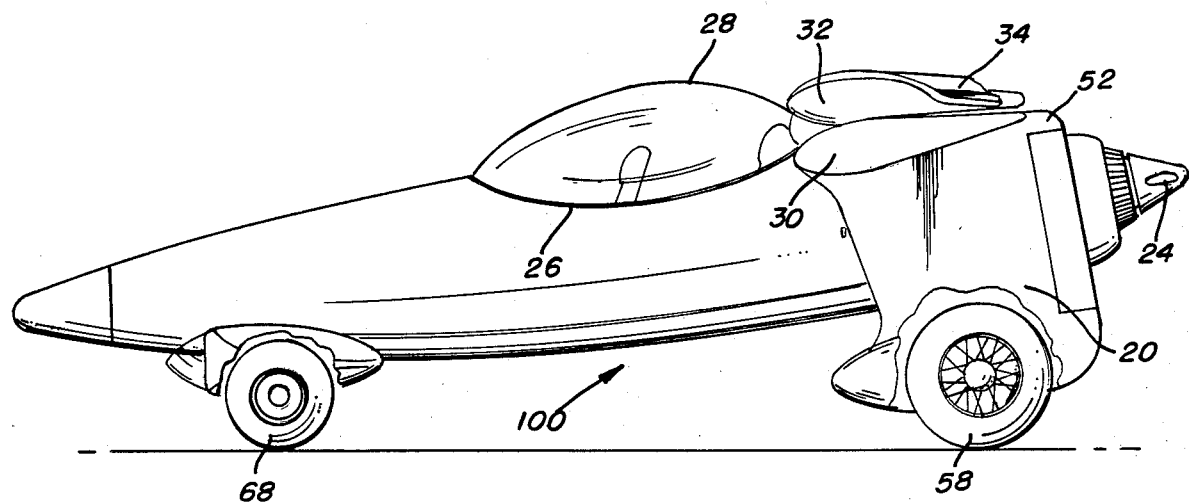
FIG. 7 is a side elevation of an automobile which has been converted from an airplane according to the present invention.

A side view of the automobile 100 is shown in FIG. 7 with the foldable wing sections 32 and 34 folded for road travel. For better ground effects, a cover is applied over the main wing 30, 32 and 34. Further, the propeller can be positioned and locked in the horizontal plane for protective purposes.

While only one embodiment of the invention has been described, one skilled in the art may realize other embodiments, therefore one should consider the description of the drawings and the claims for a complete understanding of said invention.

I claim:

1. A convertable airplane to automobile for air flight and road use, comprising;
   a fuselage having a cockpit, a forward end and a rearward end,
   a canard wing mounted on the forward end of said fuselage,
   steerable wheels mounted on the ends of said canard wing,
   a foldable wing mounted on said rearward end of said fuselage,
   a vertical stabilizer means connected to the underside of said foldable wing, and
   powered drive wheels mounted in said vertical stabilizers for automobile mode.

2. A convertible airplane to automobile as in claim 1 wherein said foldable wing has a stationary center section fixed to said fuselage, and a pair of foldable wing sections hinged to said center section, where said foldable wing sections fold flat and covered on said center section forming a downlifting wing when the airplane is converted to the automobile mode.

3. A convertible airplane to automobile as in claim 2 wherein a secondary lift wing is mounted under said rearward end of said fuselage and said foldable main wing and connected to said vertical stabilizer means.

4. A convertible airplane to automobile as in claim 3 wherein said vertical stabilizer means include two vertical stabilizers, connecting the center section of said foldable wing to said secondary lift wing.

5. A convertible airplane to automobile as in claim 4 wherein said fuselage houses an engine in said rearward end to power an aft propeller and said drive wheels.

6. A convertible airplane to automobile as in claim 5 wherein said engine has a means to disconnect alternately said propeller and said drive wheels to power said airplane and said automobile alternately.

7. A convertible airplane as in claim 6 in which wing surfaces on all wings serve as useful airfoils for lift when flying, and to hold the automobile on the ground during road use when the airplane is in the non-flying mode for ground effect.

* * * * *